United States Patent [19]
Audi et al.

[11] Patent Number: 5,619,622
[45] Date of Patent: Apr. 8, 1997

[54] RASTER OUTPUT INTERFACE FOR A PRINTBAR

[75] Inventors: Anthony E. Audi, Rochester; Frederick A. Donahue, Walworth, both of N.Y.

[73] Assignee: Xerox Corporation, Stamford, Conn.

[21] Appl. No.: 357,839

[22] Filed: Dec. 16, 1994

[51] Int. Cl.⁶ .................................................. G06K 15/00
[52] U.S. Cl. ............................................ 395/108; 395/116
[58] Field of Search ............................... 395/104, 108, 395/115, 116, 164, 165; 347/12–13, 40–42, 57, 5; 358/404, 444, 261.3, 261.4

[56] References Cited

U.S. PATENT DOCUMENTS

| | | | |
|---|---|---|---|
| 4,567,570 | 1/1986 | Peer | 364/900 |
| 4,779,105 | 10/1988 | Thomson et al. | 346/154 |
| 5,016,190 | 5/1991 | Thomson | 364/518 |
| 5,084,831 | 1/1992 | Morikawa et al. | 395/116 |
| 5,108,207 | 4/1992 | Isobe et al. | 400/70 |
| 5,170,188 | 12/1992 | Bowers et al. | 346/159 |
| 5,257,043 | 10/1993 | Kneezel | 346/140 R |
| 5,289,310 | 2/1994 | Park | 358/443 |

Primary Examiner—Arthur G. Evans
Attorney, Agent, or Firm—Daniel J. Kriege

[57] ABSTRACT

A full width array raster imaging interface for an ink jet printer. The raster imaging interface transforms raster information for printing by a thermal ink jet full width array printbar. The transformation includes dividing scan lines of the raster information into segments corresponding to the number of die in a printbar and to delay the printing of each subsequent segment by one scan line. The transformation is necessary since the printbar prints a single line of pixels in a burst of several banks or segments having a plurality of nozzles. The banks of nozzles are fired sequentially and the nozzles within a bank are fired simultaneously.

24 Claims, 10 Drawing Sheets

| | WRITE Addresses | | | | READ Addresses | | | |
|---|---|---|---|---|---|---|---|---|
| | Die | Stroke | Bank | Write | Die | Stroke | Bank | Read |
| Preload First Scan Line | 1 | 1 | 1 | 1W | - | - | - | - |
| | 1 | 1 | 2 | 2W | - | - | - | - |
| | 2 | 2 | 1 | 3W | - | - | - | - |
| | 2 | 2 | 2 | 4W | - | - | - | - |
| | 3 | 3 | 1 | 5W | - | - | - | - |
| | 3 | 3 | 2 | 6W | - | - | - | - |
| Read & Fire First Scan Line, Load Second Scan Line | 1 | 2 | 1 | 7W | 1 | 1 | 1 | 1R |
| | 1 | 2 | 2 | 8W | 2 | 1 | 1 | 2R |
| | 2 | 3 | 1 | 9W | 3 | 1 | 1 | 3R |
| | 2 | 3 | 2 | 10W | 1 | 1 | 2 | 4R |
| | 3 | 1 | 1 | 11W | 2 | 1 | 2 | 5R |
| | 3 | 1 | 2 | 12W | 3 | 1 | 2 | 6R |
| Read & Fire Second Scan Line, Load Third Scan Line | 1 | 3 | 1 | 13W | 1 | 2 | 1 | 7R |
| | 1 | 3 | 2 | 14W | 2 | 2 | 1 | 8R |
| | 2 | 1 | 1 | 15W | 3 | 2 | 1 | 9R |
| | 2 | 1 | 2 | 16W | 1 | 2 | 2 | 10R |
| | 3 | 2 | 1 | 17W | 2 | 2 | 2 | 11R |
| | 3 | 2 | 2 | 18W | 3 | 2 | 2 | 12R |
| Read & Fire Third Scan Line, Load Forth Scan Line | 1 | 1 | 1 | - | 1 | 3 | 1 | 13R |
| | 1 | 1 | 2 | - | 2 | 3 | 1 | 14R |
| | 2 | 2 | 1 | - | 3 | 3 | 1 | 15R |
| | 2 | 2 | 2 | - | 1 | 3 | 2 | 16R |
| | 3 | 3 | 1 | - | 2 | 3 | 2 | 17R |
| | 3 | 3 | 2 | - | 3 | 3 | 2 | 18R |
| | | | | | 1 | 1 | 1 | 19R |
| | | | | | 2 | 1 | 1 | 20R |
| | | | | | 3 | 1 | 1 | 21R |
| | | | | | 1 | 1 | 2 | 22R |
| | | | | | 2 | 1 | 2 | 23R |
| | | | | | 3 | 1 | 2 | 24R |

RASTER OUTPUT INTERFACE FOR A PRINTBAR

FIELD OF THE INVENTION

This invention relates generally to printing with a printbar and more particularly relates to an electronic hardware interface between a device generating a raster output and a thermal ink jet full width array printbar.

BACKGROUND OF THE INVENTION

An ink jet printer of the type frequently referred to as drop-on-demand, has at least one printhead from which droplets of ink are directed towards a recording medium. Within the printhead, the ink is contained in a plurality of channels. Piezoelectric devices or power pulses cause the droplets of ink to be expelled as required, from orifices or nozzles located at the end of the channels. In thermal ink-jet printing, the power pulses are usually produced by resistors, also known as heaters, each located in a respective one of the channels. The heaters are individually addressable to heat and vaporize the ink in the channels. As a voltage is applied across a selected heater, a vapor bubble grows in that particular channel and ink bulges from the channel nozzle. At that stage the bubble begins to collapse. The ink within the channel then retracts and separates from the bulging ink thereby forming a droplet moving in a direction away from the channel nozzle and towards the recording medium whereupon hitting the recording medium a spot is formed. The channel is then refilled by capillary action which, in turn, draws ink from a supply container of liquid ink. Operation of a thermal ink jet printer is described in, for example, U.S. Pat. No. 4,849,774.

The ink jet printhead may be incorporated into a carriage type printer or a page width type printer. The carriage type printer typically has a relatively small printhead containing the ink channels and nozzles. The printhead is usually sealingly attached to a disposable ink supply cartridge and the combined printhead and cartridge assembly is attached to a carriage which is reciprocated to print one swath of information (equal to the length of a column of nozzles) at a time on a stationary recording medium, such as paper or a transparency.

After the swath is printed, the paper is stepped a distance equal to the height of a printed swath or a portion thereof, so that the next printed swath is overlapping or contiguous therewith. The procedure is repeated until an entire page is printed. In contrast, the page width printer includes a stationary printbar having a length equal to or greater than the width of the paper. The paper is continually moved past the page width printbar in a direction substantially normal to the printbar length and at a constant or varying speed during the printing process. Because the printbars have an arrangement of linearly aligned nozzles, the alignment of the printbar with respect to the recording medium is critical.

Printers typically print information received from an image output device such as a personal computer. Typically, these output devices generate pages of information in which each page is in the form of a page description language. An electronic subsystem (ESS) in the printer transforms the page description language into a raster scan image which is then transmitted to a peripheral or image output terminal (IOT). The raster scan image includes a series of scan lines in which each scan line contains information sufficient to print a single line of information across a page in a linear fashion. In the page description language, printed pages also include information arranged in scan lines.

In printbars which print a single line of pixels in a burst of several banks of nozzles, each bank printing a segment of a line, the banks of nozzles are typically fired sequentially and the nozzles within a bank are fired simultaneously. An ink let printbar having banks of nozzles is described in U.S. Pat. No. 5,300,968 to Hawkins incorporated herein by reference. These printbars include a plurality of printhead dies, wherein each die prints a portion of a line. Within the die, the banks of nozzles print a segment of the portion of the line. Such printbars must be precisely oriented with respect to the process direction so that the printing of a last portion of a line, which is delayed in time from the printing of a first portion of a line, results in a line of pixels that is collinear. To accomplish acceptable printing using this type of printbar, the printbar is not aligned exactly perpendicular to the process direction, but is instead tilted slightly with respect to the process direction. This means that each die prints a portion of a different scan line.

Many printing devices such as xerographic printers having a laser raster output scanner can use information in raster scan format to print the image without performing any manipulation on the image data received. The architecture of a page width printbar is not, however, quite so accommodating. Since the printbars are slightly angled with respect to the process direction to compensate for the sequential firing of banks of nozzles, the output of any raster output device must be manipulated before printing can occur. Consequently, the raster data to be printed on a thermal ink jet page width printbar must undergo some transformation. It is therefore important that the transformation be done in a timely manner. Historically, the necessary data manipulation was done with software. Software processing performed the transformations before the data was shipped to the printbar. These processes, however, are time consuming and not very efficient.

Various printers and methods for manipulating image data for printing on a recording medium are illustrated and described in the following disclosures which may be relevant to certain aspects of the present invention.

U.S. Pat. No. 4,779,105 to Thomson et al. describes a printer interface for a non-impact printing apparatus and more particularly to apparatus which converts originating image data into output image data and a raster scan arrangement suitable for presentation to a printing subsystem.

U.S. Pat. No. 5,016,190 to Thomson describes a method and apparatus for converting data representative of a plurality of cells arranged independently of one another on a page into data in raster scan order for subsequent printing. Cell data for individual cells is fetched in an order dependent on the line of raster scan where the cell first appears and the bit position for the first bit representing the cell.

U.S. Pat. No. 5,084,831 to Morikawa et al. describes a printer having a memory for storing dot image data to be printed. The printer prints in two modes, the first mode being a full bit map mode for storing a page of data and a second strip map mode for a smaller amount of data than a page of data. In the full bit map mode, the bit data is sent to the printer after all the bit data of a page has been stored in the bitmap memory. In the strip map mode, an image of one page is divided into a plurality of image portions and the bit data is written/read to and from the bit map memory in the unit of the image portion.

U.S. Pat. No. 5,108,207 to Isobe et al. describes a printer with a variable memory size. The printer includes a memory unit having a first memory area for storing input data and a second memory area for storing image data obtained by developing input data. The first memory area and the second memory area are arranged within the same memory space to form the memory unit. An area control unit changes a proportion of the capacity of the second memory area within the memory unit to alter the relative proportions of the first memory area and the second memory area in the memory space forming the memory unit.

SUMMARY OF THE INVENTION

In accordance with one aspect of the present invention, there is provided a printer for printing a raster image organized into a plurality of scan lines. The printer includes a printbar having a plurality of printhead dies, each of the printhead dies having a linear array of print nozzles wherein the linear array of print nozzles is arranged in banks of nozzles. The printer also includes a memory circuit organized into a plurality of addressable memory locations and a raster interface circuit writing portions of one of the scan lines to the addressable memory locations in a first order, reading the contents of the addressable memory locations in a second order different from the first order, and transmitting the contents of the addressable memory locations read from the memory circuit in the second order to the printbar.

Pursuant to another aspect of the present invention, there is provided a method for printing a raster image organized into a plurality of scan lines generated by an output device with a printbar having a plurality of printhead dies wherein each die includes a plurality of nozzles. The method includes the steps of organizing a memory space into a plurality of rows and a plurality of columns, the plurality of rows being at least equal to the plurality of printhead dies and the plurality of columns being at least equal to the plurality printhead dies, dividing each of the plurality of scan lines into a plurality of portions, writing each portion of one of the plurality of divided scan lines to a different row of the memory space, reading the written portions from a single row of the memory space and transmitting the read portions to the printbar.

DETAILED DESCRIPTION OF THE INVENTION

Figure 6:
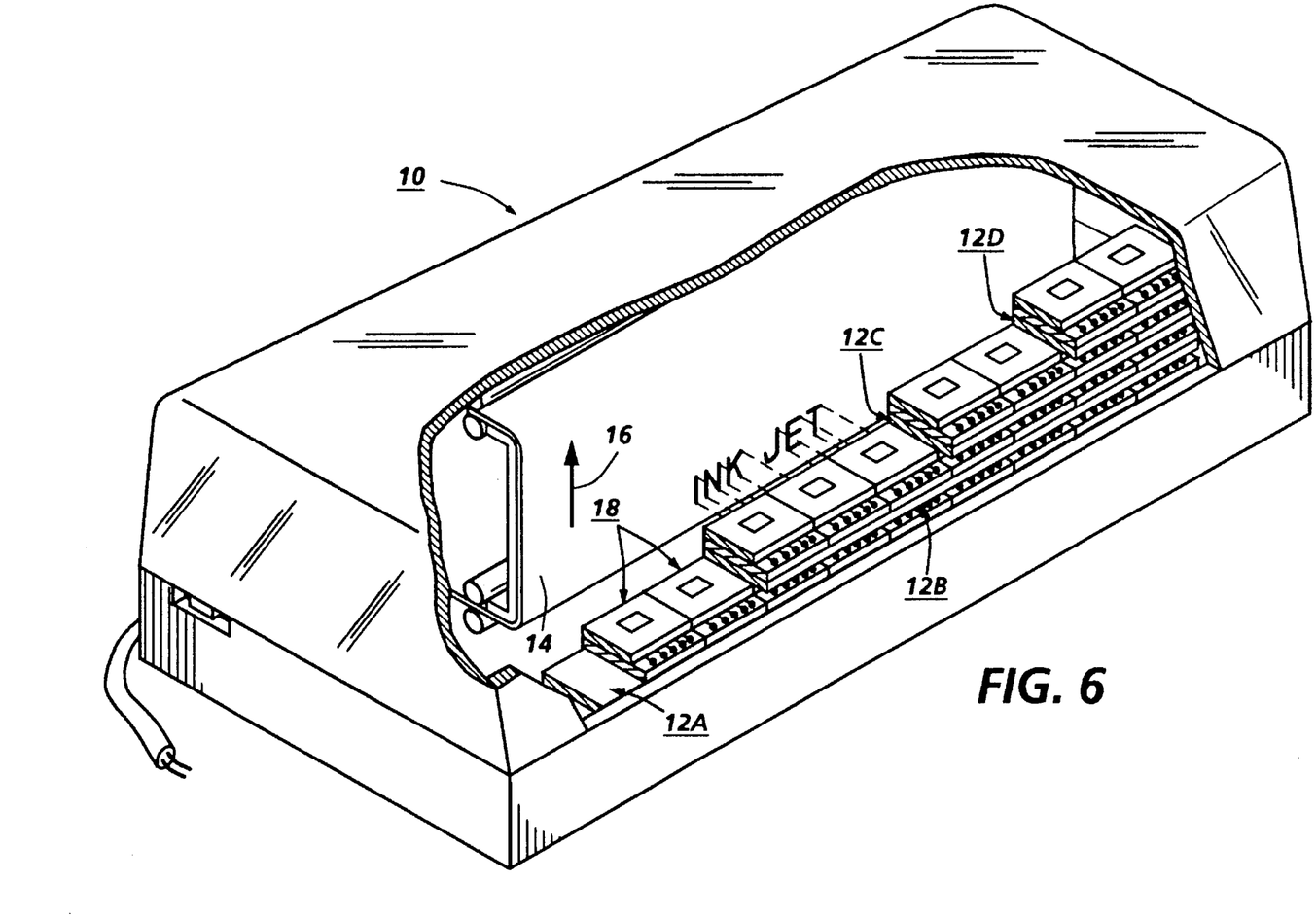
FIG. 6 is a fragmentary perspective view of a printer utilizing a thermal ink jet printbar for full page width printing.

FIG. 6 is a fragmentary perspective view of a page width type, multi-color, thermal ink-jet printer 10. In general, a page width monochrome printer has a single stationary printbar such as 12A, having a length equal to or greater than the length of a recording medium 14 such as a sheet of paper or a transparency. A multi-color page width printbar has four stationary printbars 12A, 12B, 12C and 12D stacked or spaced one above the other, with the nozzles of each printbar aligned linearly with respect to one another. The recording medium 14 is continually moved past the page width printbars in the direction of arrow 16, a direction substantially normal to the printbar length and at a constant or varying speed during the printing process. Refer to U.S. Pat. Nos. 4,463,359 to Ayata et al. and 4,829,324 to Drake et al. for examples of page width printing.

The page width printbars 12 are made of an array of individual printhead subunits or dies 18. Any known method may be used to fabricate the individual printhead dies 18. One example, for instance, is U.S. Pat. No. Re. 32,572 to Hawkins et al. incorporated herein by reference. In general, printhead subunits are derived from a heater die containing an array of resistors and the associated electronic circuitry and a channel die containing arrays of recesses used as sets of channels ending in nozzles and having associated reservoirs for carrying ink into the channels. Each of the printhead dies 18 formed of an individual heater die and channel die are aligned along the width of a page and attached to a substrate to form the page width printbar. It should be noted that one of the individual printhead dies 18 may be incorporated into a printhead cartridge attached to a scanning carriage for use in a scanning type thermal ink jet printer.

Figure 1:
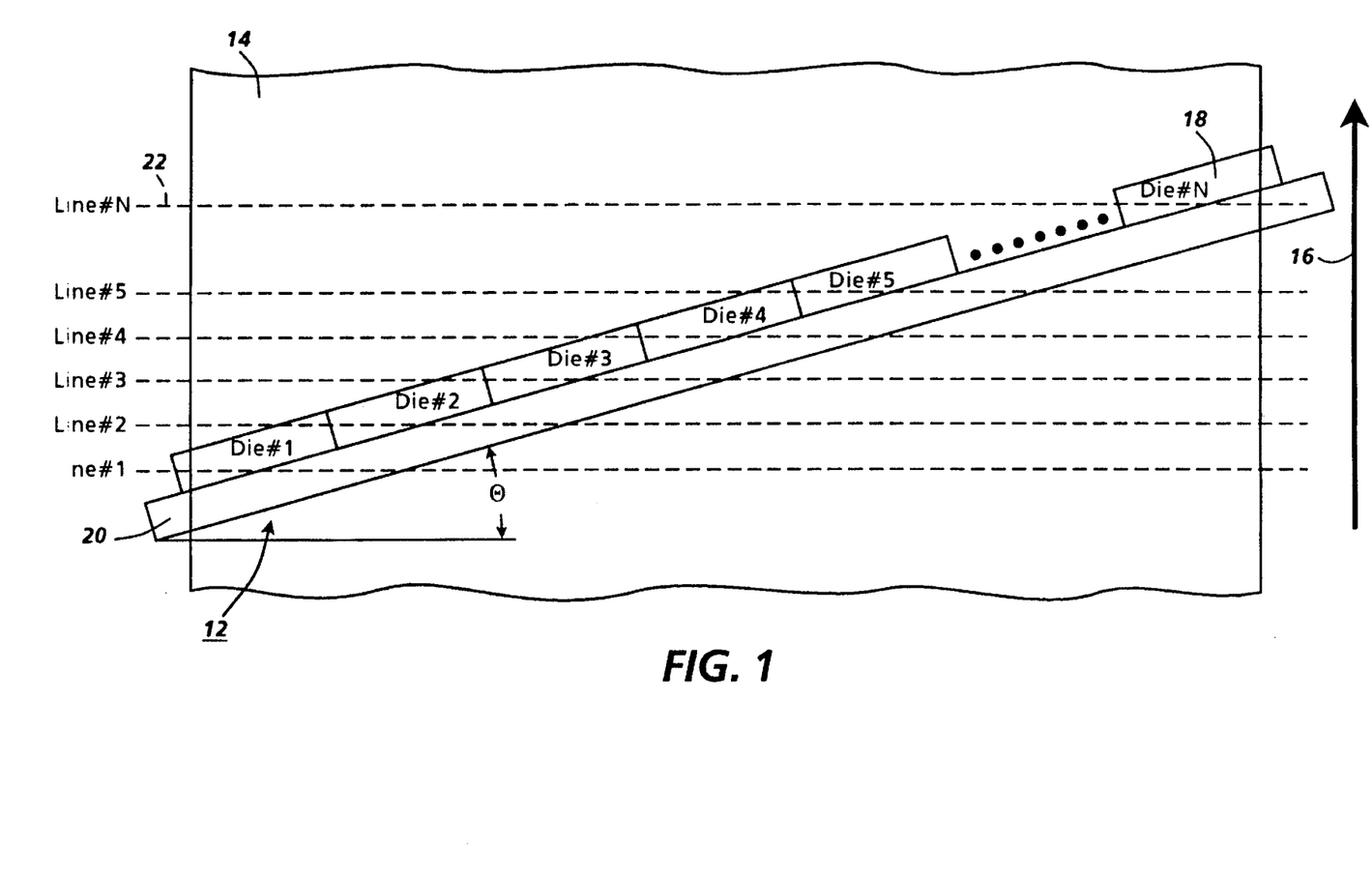
FIG. 1 illustrates a schematic depiction of a full width printbar angled with respect to the process direction during a printing operation.

Each individual printbar 12 includes a plurality of the printhead dies 18 butted together into and mounted on a substrate 20 which can be made of a material such as graphite or metal, as illustrated in FIG. 1. Each of the printhead dies 18 include several hundred or more nozzles which are fired sequentially in banks of nozzles. Each bank typically includes between four to eight nozzles. When mounted on the printbar 12, all of the die 18 are fired in parallel for one full printing of the entire printbar and all of the banks within a die are fired sequentially. This means that a straight line printed perpendicularly to the process direction 16 is actually composed of many portions of a line, each portion printed simultaneously which meet at the end points thereof.

Due to the finite amount of time necessary to ripple through an entire die, or stroke of a die, each printhead die 18 must be tilted slightly or angled with respect to the process direction 16 to compensate for the time it takes to ripple through each stroke of a single die. Otherwise, the line portions printed by a die would be angled with respect to the process direction of the recording sheet since the recording sheet is in motion. For example, if a die has 256 nozzles which are fired in banks of four nozzles at a time, and each firing lasts 3.2 microseconds, each stroke of the die will take approximately 210 microseconds to complete. To compensate, die are tilted at an angle $\Theta$ with respect to a horizontal scan line 22 to provide the proper alignment of the ink spots when deposited on the recording sheet 14. The angle $\Theta$ is approximately equal to the size of one ink spot or pixel divided by the length of the printhead die 18. Due to manufacturing concerns, it is impractical to tilt each die individually and to align the entire printbar along a single scan line. Instead, the printhead die are mounted collinearly and the entire printbar 12 is tilted at the angle Θ. If there are N die on a printbar 12, then the bar is tilted by N pixels or scan lines, where the height of a scan line is equal to one pixel, so that the tilted printbar extends across N scan lines. This means that each die 18 is printing a portion of a different scan line from the raster image on a different line of the recording medium as illustrated in FIG. 1. For instance, die #1 will print on line #1. Because the printbar 12 does not print along a single line, but instead prints on many lines, the manipulation of data used in the printing operation is not the simple operation of receiving linear data from an ESS and then printing the information as received.

Figure 2:
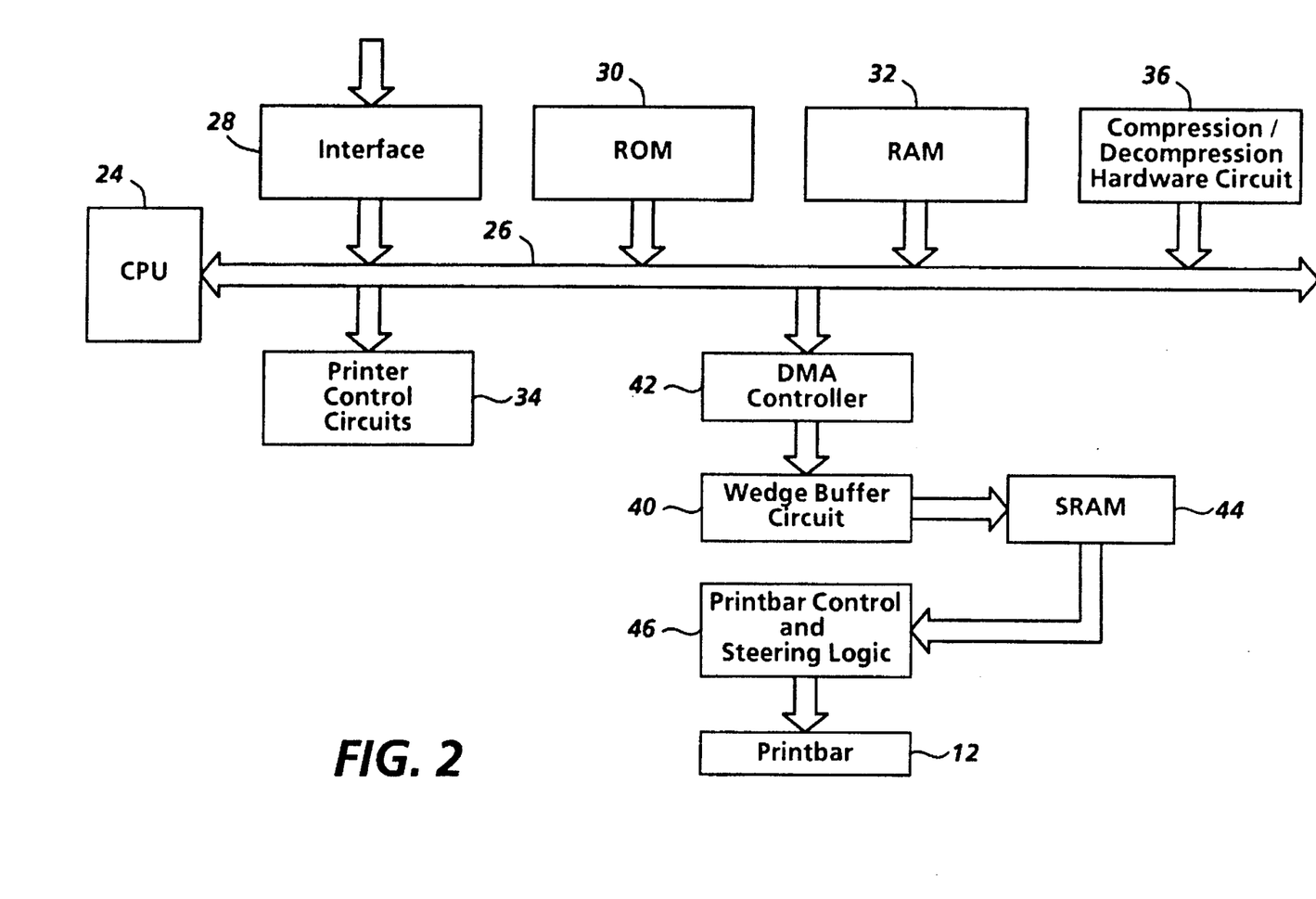
FIG. 2 is a block diagram of an electronic circuit for an ink jet printer incorporating a wedge buffer circuit and a static random access memory (RAM) of the present invention.

Referring to FIG. 2, there is shown a block diagram of the electronic circuitry in an ink jet printer incorporating the present invention. A central processing unit or CPU 24 is connected through a bus 26 to an interface 28 which, in turn, is connected to an external device such as a host computer. The host computer provides information in the form of a page description language to the printer for printing. The CPU 24 is also connected to a read only memory (ROM) 30 which includes an operating program for the CPU 24. A random access memory 32 connected to the bus 26 includes accessible memory including print buffers for the manipulation of data and for the storage of printing information in the form of bitmaps received from the host computer. In addition to the ROM 30 and the RAM 32, various printer control circuits 34 are also connected to the bus 26 for operation of the printing apparatus which includes paper feed driver circuits as is known by those skilled in the art. A compression/decompression hardware circuit 36 may also be included in the printer 10 for altering input image data from one form to another received from a host computer for proper printing of the image by the printbar 12.

To print an image, the printbar 12 must print information received from the ESS or stored in the RAM 32. This information may be in the form of raster data which is composed of a series of scan lines, each of the scan lines including a number of individual bits each bit indicating whether or not a nozzle will fire in a particular scan line. The information received from the host computer can be in the form of a page description language as is known in the art, and which is converted to raster format data by the ESS of the printer 10 before printing by the printbar 12. Because the printbar 12 prints each of the die simultaneously and each bank within a single die sequentially, the raster data to be printed must undergo a transformation. Typically, a decomposer or post processing software performs the transformation before the data is shipped to the printbar. Software manipulation is, however, time consuming and not very efficient.

To overcome these problems, the present invention implements a hardware circuit solution to the described problem. Raster data is transformed in two ways. The first transformation is to divide the received data, scan line by scan line, into N portions so that the N die print in parallel. The second transformation is to delay the printing of each subsequent portion by one line starting with a one line delay from die #1 for die #2, a two scan line delay for die #3 and so on up to N die. Both of these transformations occur in a timely manner to complete a printing operation.

A wedge buffer circuit 40 is connected to the bus 26 through a DMA (direct memory access) controller 42. The DMA controller 42 provides transfer of data directly from the memory of the host computer or from the RAM 32, thereby freeing the CPU 24 for other tasks as is known by those skilled in the art. The DMA controller in the present embodiment would typically retrieve a single page of information at a time. The wedge buffer circuit 40 takes this information which is buffered in the DMA controller one scan line at a time, and processes the information for storage in a static RAM 44. The information is stored in RAM 44 in a particular order. After storage, the information is removed in a different order than the order of storage and sent to a printbar control and steering logic circuit 46. The printbar control and steering logic circuit 46 then transmits this information to the printbar 12 under control of the CPU 24.

Figure 3:
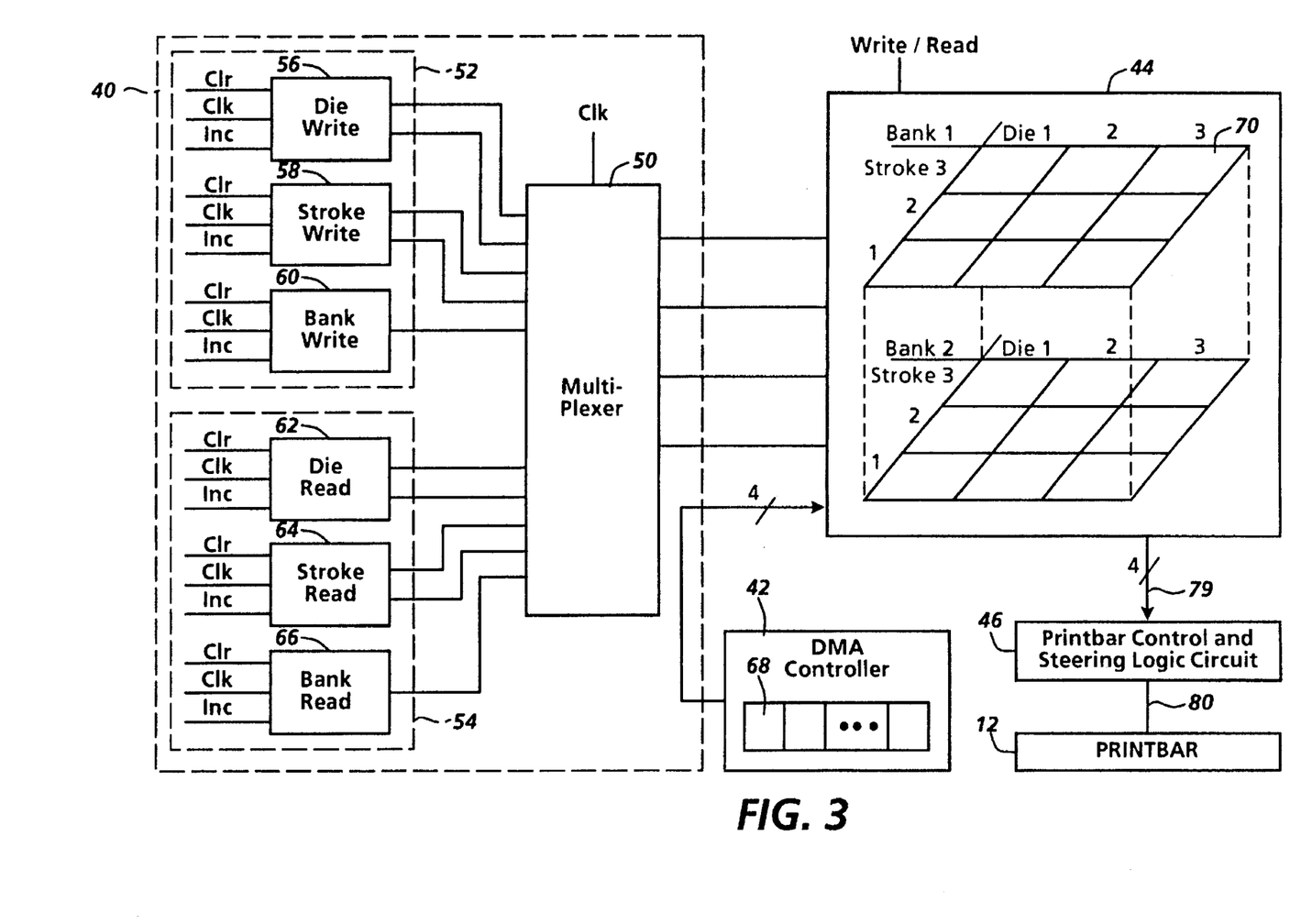
FIG. 3 is a block diagram of a raster interface circuit including a direct memory access (DMA) controller, the wedge buffer circuit, the static RAM, and steering logic of the present invention.

FIG. 3 illustrates a block diagram of a raster interface circuit including the wedge buffer circuit 40, the static RAM 44, the DMA controller 42, the printbar control and steering logic 46, and the printbar 12. The wedge buffer circuit 40 includes three main components, a multiplexer 50, a write address counter 52 and a read address counter 54. The write address counter 52 includes three subcounters, a die write counter 56, a stroke write counter 58 and a bank write counter 60. The read address counter also includes three subcounters, a die read counter 62, a stroke read counter 64, and a bank read counter 66. Each of the counters in the write address counter 52 or the read address counter 54 have output lines coupled to the input lines of multiplexer 50. The multiplexer 50 has output lines coupled to the address selection lines of the static RAM 44.

In operation, the three subcounters of the write address counter 52 partition the static RAM 44 into a three dimensional address space having addressable memory locations wherein the rows are labeled stroke, the major columns are labeled die, and the layers or pages containing sub-columns or divided columns of the die columns are labeled bank. To write information to the static RAM 44, the multiplexer 50 under control of the CPU 24 selects the output lines of the write address counter 52 for writing information to the static RAM 44. Information, which has been retrieved by the DMA controller 44, is held by the DMA controller 44 in a scan line buffer 68 thereof. The information in the scan line buffer 68 includes a single scan line of information subdivided into segments of pixels or bits which are equivalent to the number of nozzles within a single bank of the printbar 12. The write address counter 52 directs each bank of information held in the scan line buffer 68 to one of a number of cells 70 within the static RAM 44, each cell 70 storing a single segment of information. The information written into the static RAM 44 is written to the cells 70 in a particular order to be further described in FIGS. 4 and 5. When information is to be printed by the printbar 12, the information stored in the static RAM is read out of the static RAM according to addresses generated by the read address counter 54 which has been selected by the multiplexer 50 under control of the CPU 24. As information is read from the static RAM 44, it is sent to the printbar control and steering control logic circuit 46 which then directs the information to the appropriate printhead dies on the printbar 12.

Figure 4:
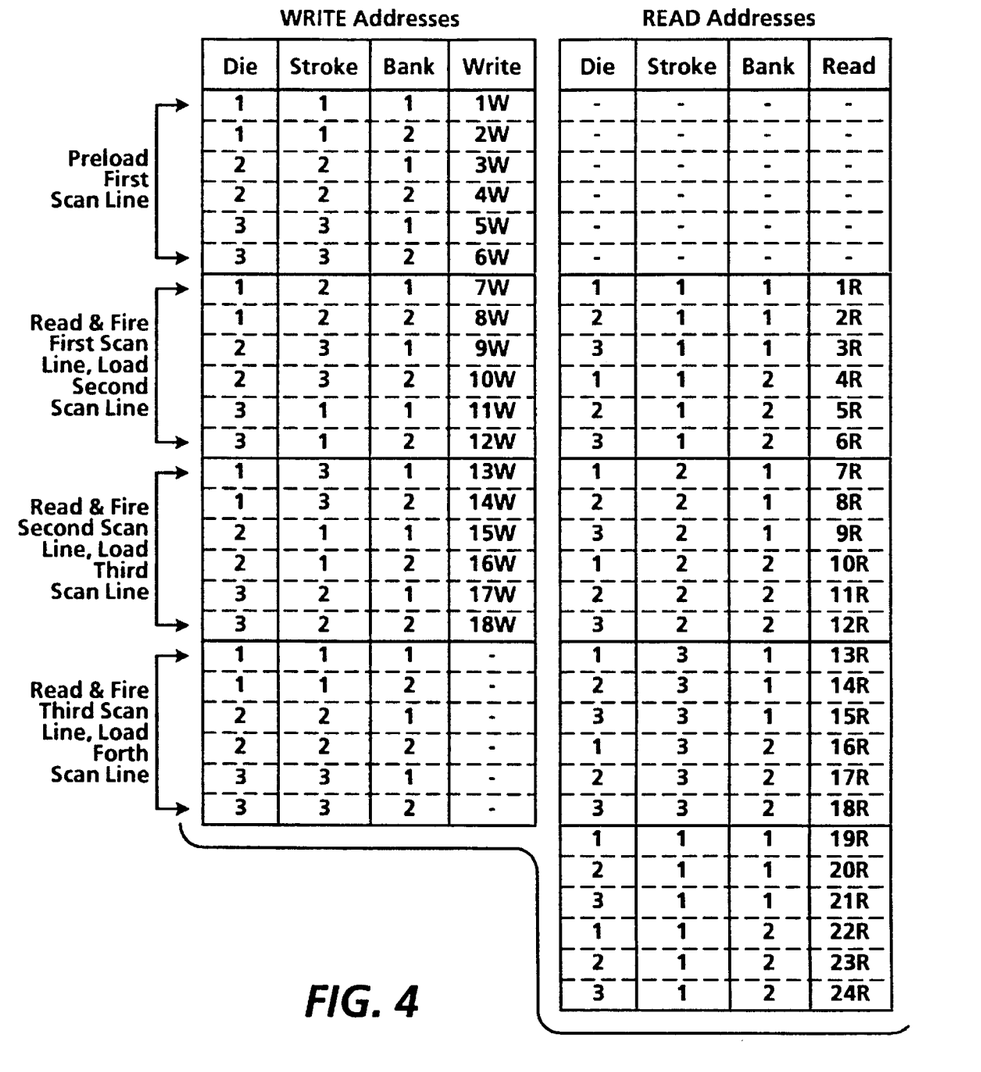
FIG. 4 is an illustration of the sequencing of write counters and read counters of the wedge buffer circuit.

FIG. 4 illustrates how the write address counter 52 generates write addresses and the read address counter 54 generates read addresses for the static RAM 44 for an illustrative printbar including three printhead die, each die consisting of two banks of nozzles. The wedge buffer circuit 40 is synchronized to the logic which drives the printbar 12. Before the printing of a single page begins, the wedge buffer circuit 40 ripples through all of its write addresses, filling the static RAM 44 with zeros (white data). This is necessary because as die #1, is printing its portion of the first scan line, all of the other die, die #2 through die #N as illustrated in FIG. 1, must not be printing. This will become more apparent in the discussion of FIG. 5.

After initialization, the wedge circuit 40 preloads the static RAM 44 with one scan line of data, which in this example consists the information necessary to control three printhead die each having two banks of nozzles per die. Preloading is performed so that on the very first read cycle, valid data is available in the static RAM 44 for printing. As illustrated in FIG. 4, the first scan line is preloaded by incrementing the die write counter 56 as shown. A fourth column in the write address portion of FIG. 4, includes a write column which numbers the write operations consecutively from one W to eighteen W to show the sequence of write operations.

FIG. 5 illustrates consecutive write and read operations to and from the static RAM 44 as well as which dies print upon the recording sheet 14. In FIG. 5, the static RAM 44 is illustrated as a two dimensional array for ease of illustration and discussion.

Figure 5A:
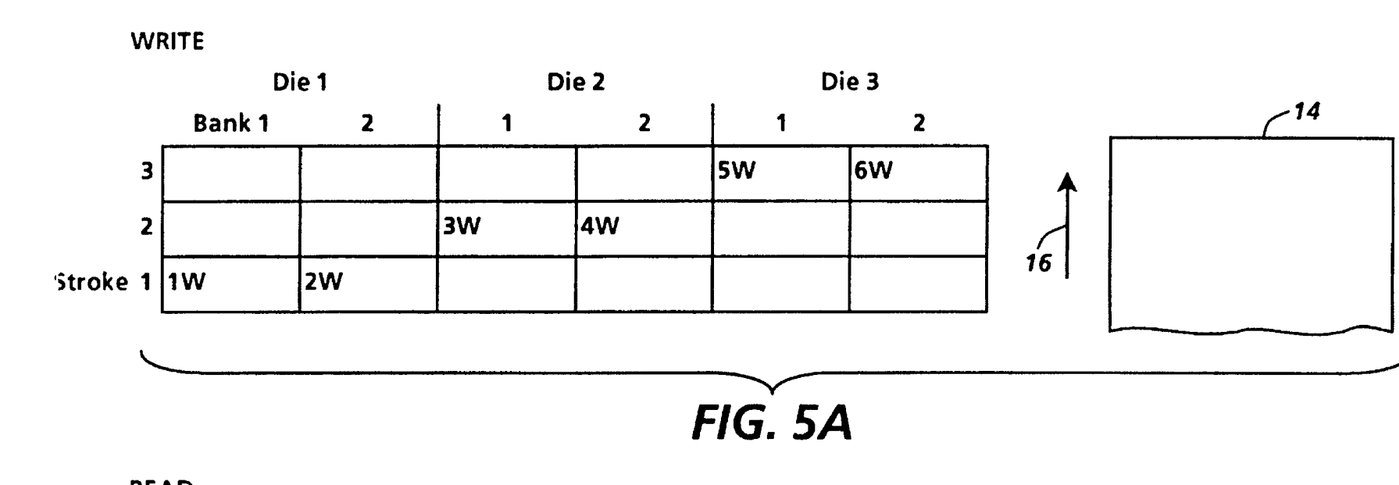
FIGS. 5A through 5J are a schematic representation of the operations of writing information into the static RAM, reading information from the static RAM, and printing the information read from the static RAM on a recording medium.
Figure 5B:
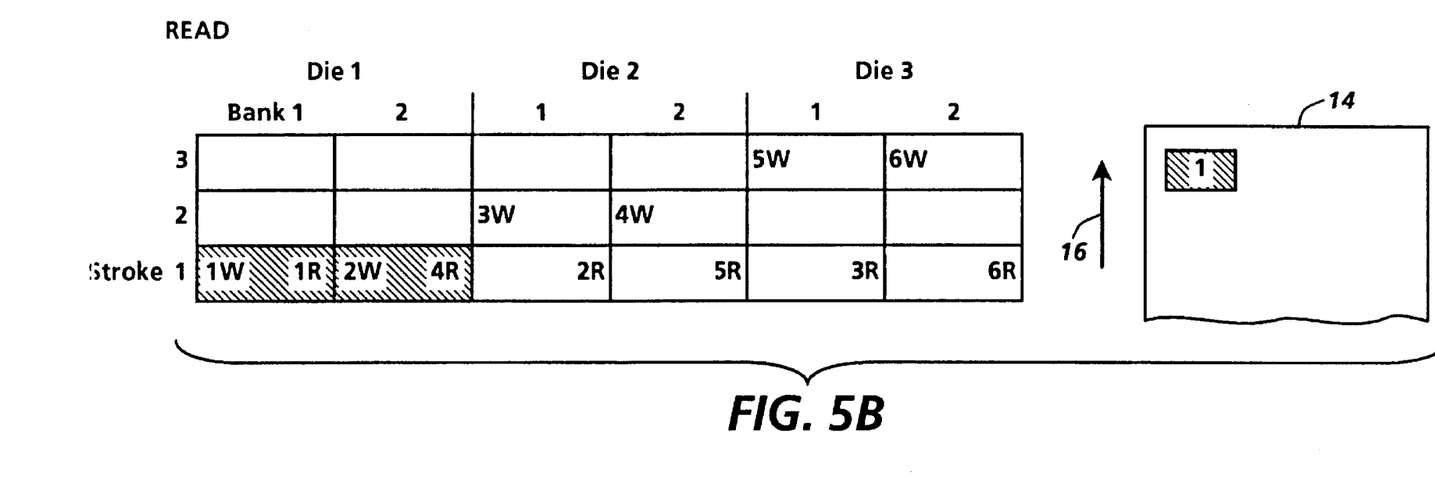

Looking at FIG. 4 in combination with FIG. 5A, it can be seen that preloading the first scan line in the static RAM 44 results in the storage of data in different rows thereof. Each write operation 1W through 6W is shown written to the appropriate cell selected by the die, stroke and bank counters incremented according to the sequence of FIG. 4. Once the first scan line has been written into the static RAM 44, the information to be printed is read from the static RAM 44 according to FIG. 4 and FIG. 5B. As shown in FIG. 5B, 1R through 6R indicates the sequential reading of information from the static RAM according to the counter sequence of FIG. 4. Since, however, information was written into the static RAM as shown in FIG. 5A, only stroke #1 of die #1, bank #1 and #2, is printed. (Only die #1 prints information since die #2 and die #3 can't print before line #1 since die #2 and die #3 print information for scan line #1 later due to the tilt of the printbar. This is why the static RAM is initially filled with zeros.) Information to be printed resulting from a read operation is shown in the highlighted portions of the static RAM 44 and is also shown to the right in a schematic depiction of the recording sheet 14 having a highlighted portion showing that die #1 has printed on a first line of the recording sheet 14.

Figure 5C:
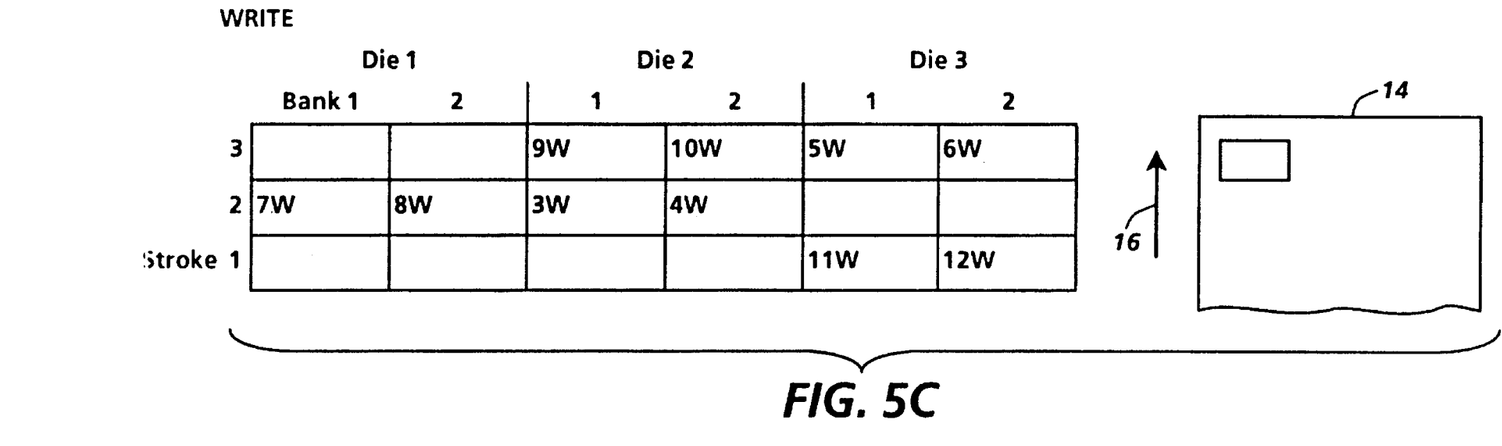

Once the first scan line is printed, the second scan line is loaded into the static RAM according to FIG. 5C in accordance with the write addresses generated by the write address counter illustrated in FIG. 4. In FIG. 5C, cells of static RAM corresponding to die #1 of stroke #2, die #2 of stroke #3, and die #3 of stroke 1 are filled with information from the second scan line of the raster image to be printed. As can be seen from FIG. 5C, the information read into the static RAM for a single scan line covers one die in each of the three rows of the static RAM 44. This is because each die prints on a separate line of the recording medium. This figure also illustrates that since the printbar 12 extends across three lines during a single printing operation of the entire printbar, the static RAM need only include three rows (STROKE 1, 2, 3) of memory. The second scan line consists of the write operations of 7W through 12W.

Figure 5D:
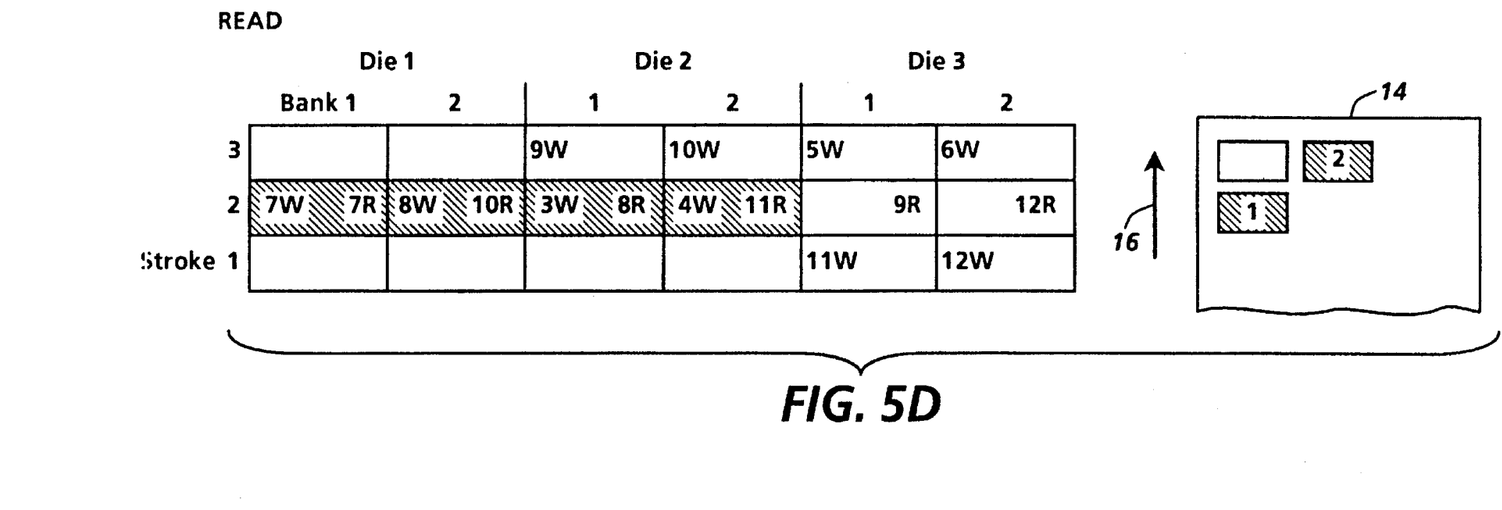
Figure 5E:
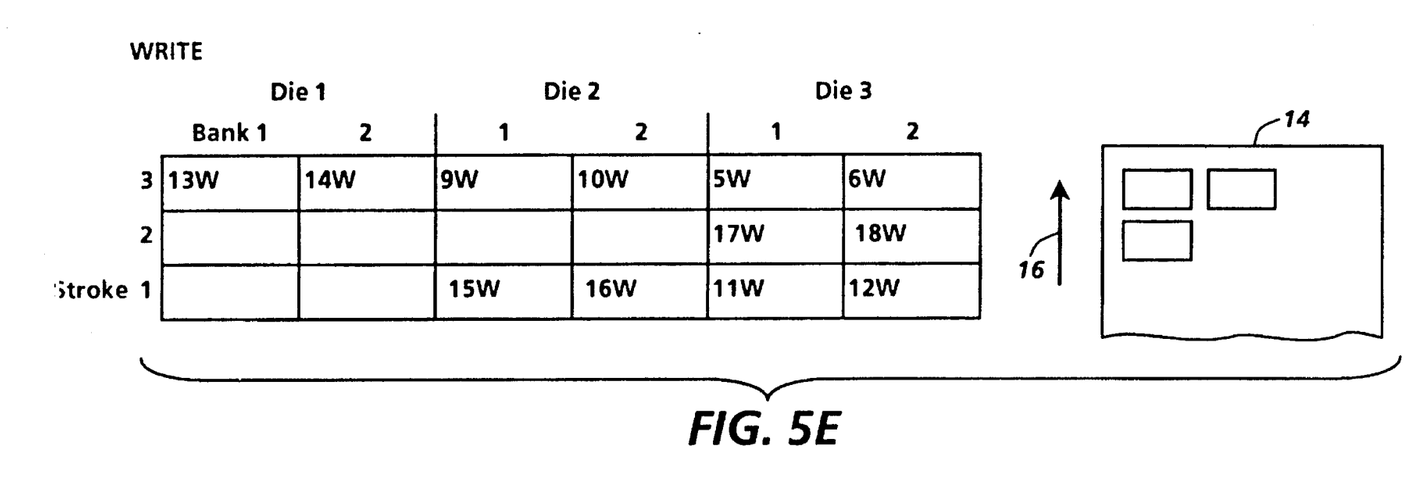
Figure 5F:
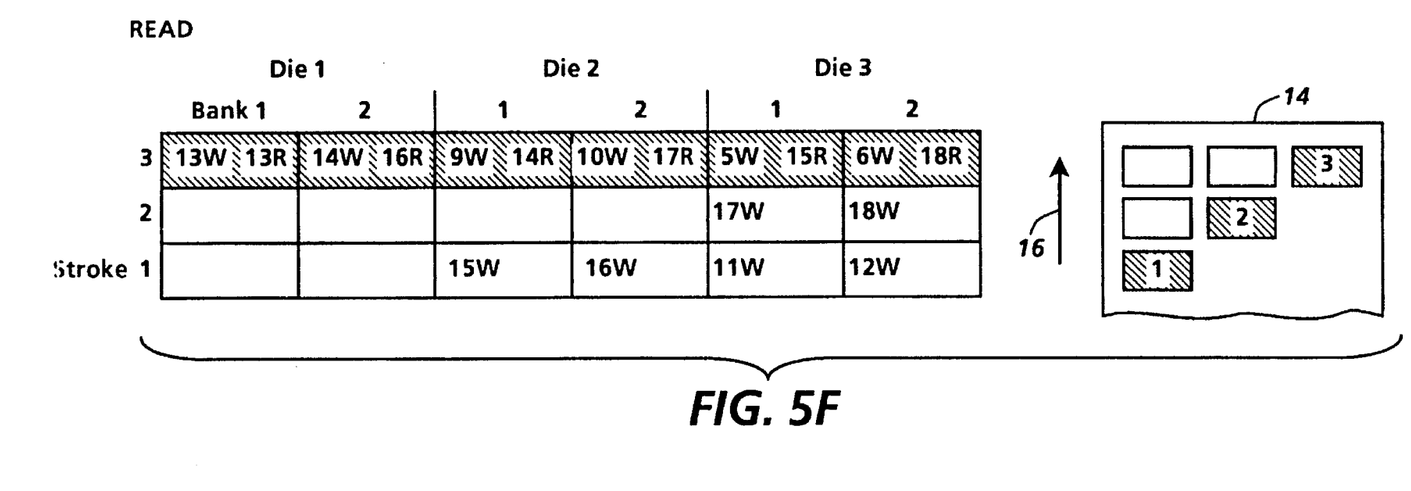

After writing the second scan line into the static RAM 44, a read operation occurs according to FIG. 5D in which read operations 7R through 12R are performed. As before, the highlighted portions of FIG. 5D illustrate the cells of the static RAM which include information to be printed as opposed to cells containing white space. The schematic depiction of the printed sheet 14 also shows these portions in highlight and illustrates the fact that the printbar 12 is angled with respect to the process direction 16 and therefore prints on separate lines. FIG. 5E illustrates the loading of the third scan line into memory and includes the write operations 13W through 18W according to FIG. 4. As before, since each of the individual die will print on a different line, die #1 of stroke #3, die #2 of stroke #1, and die #3 of stroke #2 are loaded with information. Once loaded, the third scan line is fired according to the read operations 13R through 18R of FIG. 5F which are highlighted to indicate that each of the highlighted cells of the row stroke #3 include image information which has been read into the static RAM 44. At the FIG. 5F operation, each die of the printbar is printing across the entire page.

Once the third scan line is printed, a fourth scan line would be loaded in the static RAM 44 according to the write addresses shown in FIG. 4. These write addresses correspond to the same write addresses which were used to preload the first scan line, thereby illustrating the fact that the addressing scheme of the present invention follows a pattern which repeats every N scan lines, where N is equal to the number of printhead dies in a printbar. Since the write addressing scheme of the illustrated embodiment repeats itself every three scan lines, further discussion of printing more than three scan lines is not necessary. Consequently, printing of three lines only is illustrated in FIG. 5G through FIG. 5J.

Figure 5G:
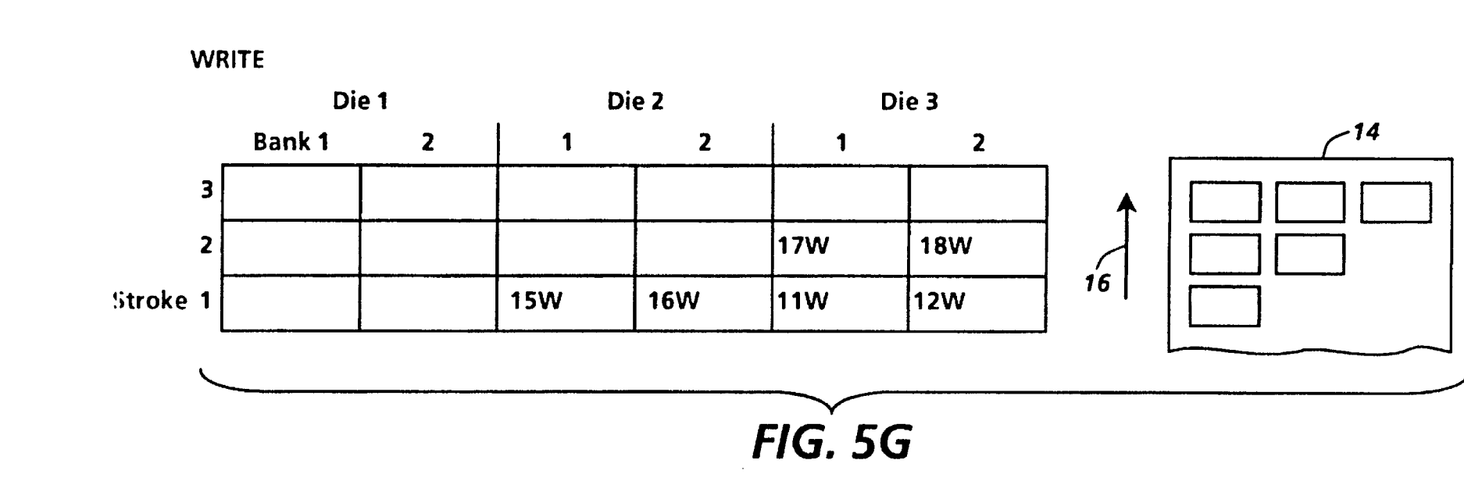

FIG. 5G shows that a write operation would store no data in the static RAM since all information necessary to print three scan lines of information has already been written in the static RAM 44. FIG. 5G does, however, illustrate which cells of the static RAM include information remaining to be printed.

Figure 5H:
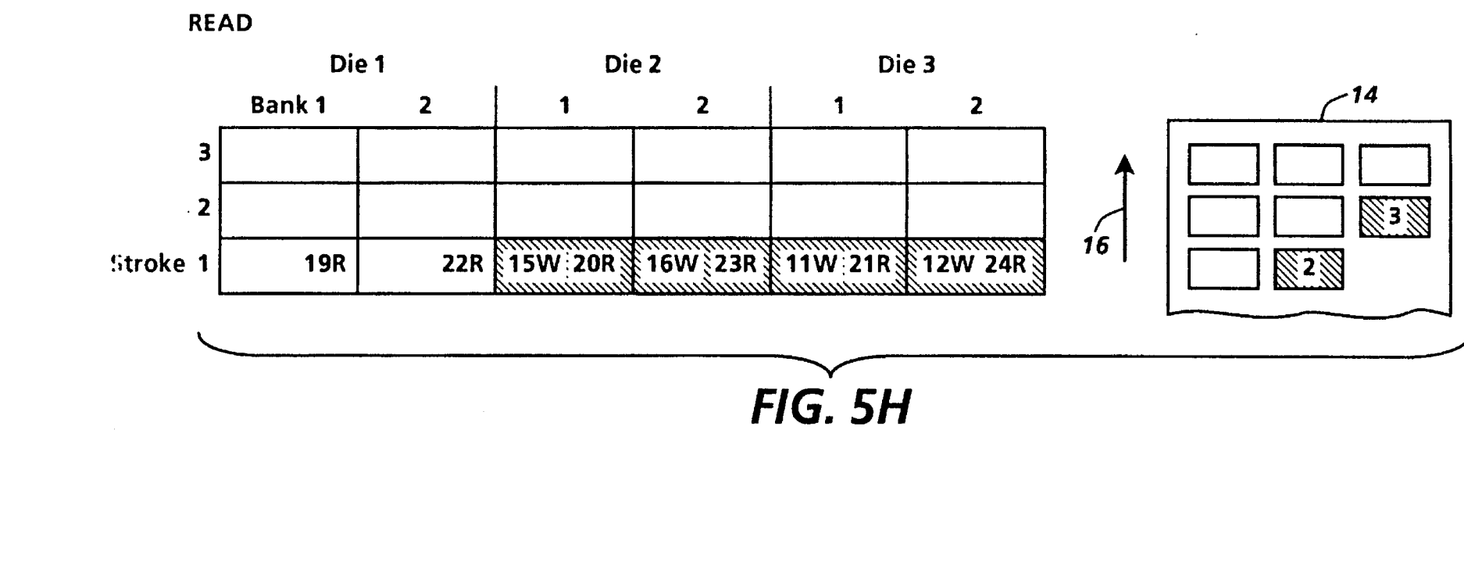

A fourth read operation occurs in FIG. 5H in which read operations 19R through 24R are performed according to the read addressing scheme of FIG. 4. This read addressing scheme corresponds to the read addressing scheme for the reading and printing of the first scan line operations of 1R to 6R. As with the write addressing scheme, the read addressing scheme also repeats itself every N printings of a scan line where N is equal to the number of lines crossed by the printbar 12. The information printed on the recording sheet 14 of FIG. 5H includes information which appears in the cells of stroke #1, die #2 and stroke #1, die #3. There is no information in stroke #1, die #1 since this portion of the static RAM would have included information necessary to print the beginning of a fourth scan line.

Figure 5I:
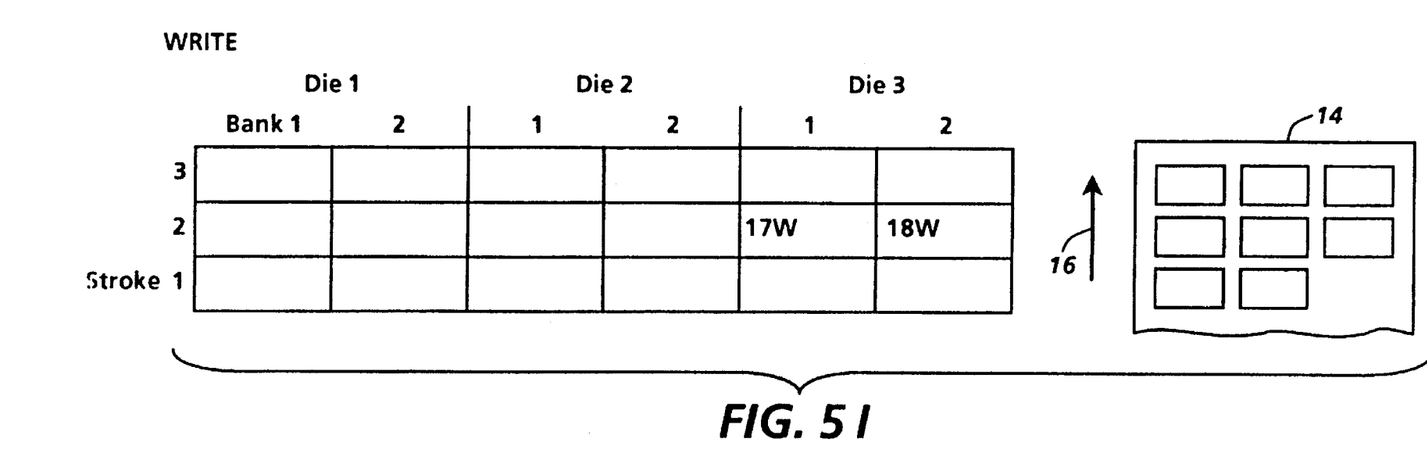
Figure 5J:
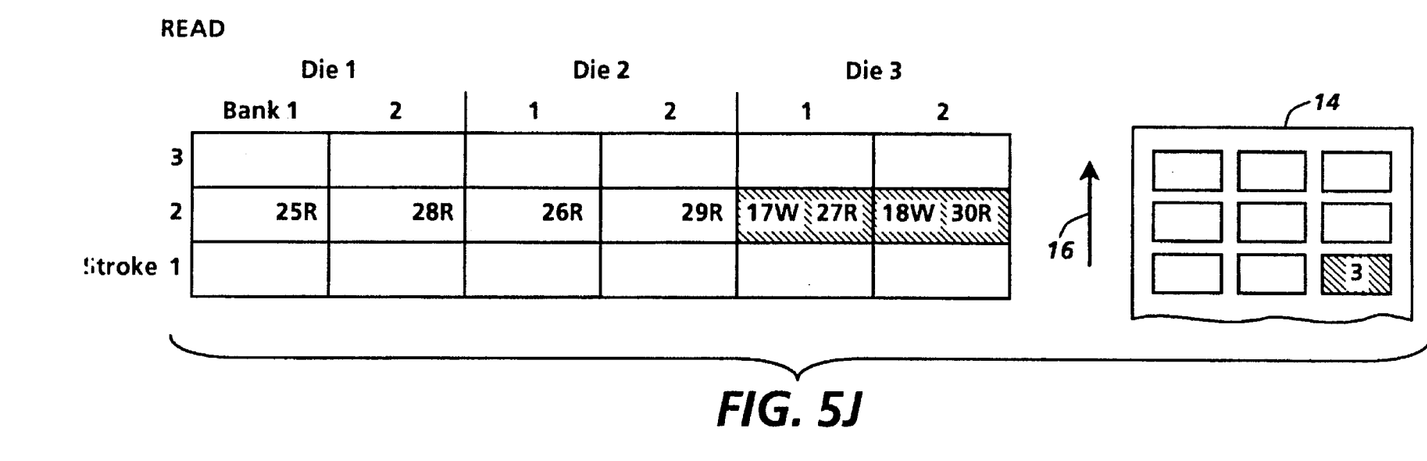

At FIG. 5I, another write operation would occur if a fifth scan line were to be printed on the page. However, since we are only printing three scan lines of information, FIG. 5I illustrates that only die #3, stroke #2 includes information to be printed. Consequently, in FIG. 5J, dies #1, #2 and #3 of stroke #2 are read from the memory but only banks #1 and #2 of die #3 contain information to be printed. This read operation completes the information retrieval from the static RAM to finish the printing of a single page of information having three lines of printed information each line being one pixel in height.

Since the present invention prints portions of a scan line delayed in time from other portions of a scan line due to the necessary angling of the printbar with respect to the process direction, the information written into the static RAM 44 is essentially delayed in time by writing to different rows of the static RAM and reading information from the same row of the static RAM. This staggering of information within the static RAM 44 enables the read operations to read information from the static RAM along a single row corresponding to the printing of all nozzles along the printbar 12. This provides a simple addressing scheme which is performed by the read address counter 54 as illustrated in FIG. 4.

Data read from the static RAM 44 is sent to the printer control and steering logic circuit 46 of FIG. 3 over a parallel bus line 79. The steering logic circuit 46 includes a single serial output line 80 for transmitting the information to the printbar 12 which then sends the serialized information to the appropriate nozzles of the printbar as illustrated in the previously referenced U.S. Pat. No. 5,300,968. To accomplish the transformation of the information read from the static RAM 44 for transmitting over the serial transmission line 80, the printbar control and steering logic 46 includes a plurality of parallel to serial transformation circuits in which the number of parallel to serial transformation circuits is equal to the number N of the printhead dies within the printbar 12.

The present invention performs the data manipulation in real time as the image is being printed. It also allows a thermal ink jet printbar to interface to an electronic subsystem having a raster output. In addition, the present invention is fully scalable to accommodate any number of die per print bar, any number of banks per die or any number of nozzles per bank. It is, therefore, apparent that there has been provided in accordance with the present invention, a full width array raster imaging interface for use with a printer having a printbar printing in a sequential arrangement of printhead dies that fully satisfies the aims and advantages hereinbefore set forth.

While this invention has been described in conjunction with a specific embodiment thereof, it is evident that many alternatives, modifications and variations will be apparent to those skilled in the art. For instance, the present invention is not limited to thermal ink jet printbars which sequentially print segments of the printhead elements as described, but can also be effectively used with piezoelectric ink-jet printbars or any printbar which sequentially prints portions of the printbar. In addition, the present invention is not limited to full width array printbars but is equally applicable to partial width array printbars which cover only a portion of the recording medium. Accordingly, the present invention is intended to embrace all such alternatives, modifications, and variations that fall within the spirit and broad scope of the appended claims.

What is claimed is:

1. A printer for printing a raster image organized into a plurality of scan lines on a recording medium moving in a process direction, comprising:
   a printbar, including a plurality of nozzles, angled with respect to the process direction, printing portions of N of the plurality of scan lines substantially simultaneously;
   a memory circuit organized into N rows of addressable memory locations and a plurality of columns the number thereof being equal to the plurality of nozzles; and
   a raster interface circuit, coupled to said memory circuit, writing portions of one of the scan lines to N rows of said plurality of rows of addressable memory locations in a first order, reading the contents of said N rows of said plurality of rows of addressable memory locations in a second order different from the first order, and transmitting the contents of said N rows of said plurality of rows of addressable memory locations read from said memory circuit in the second order to said printbar.

2. The printer of claim 1, wherein said printbar includes a plurality of printhead dies, each of said printhead dies having a linear array of print nozzles, said linear array of print nozzles arranged in banks of nozzles.

3. The printer of claim 2, wherein said nozzles within said banks eject ink substantially simultaneously and said banks of nozzles within one of said dies ejects ink sequentially.

4. The printer of claim 3, wherein said addressable memory locations comprise cells, each of said cells storing a segment of said portions.

5. The printer of claim 4, wherein said memory circuit includes a plurality of address selection lines for addressing each of said addressable cells.

6. The printer of claim 5, wherein said raster interface circuit comprises a buffer circuit including a multiplexer having a first input, a second input, and an output, said output connected to said address selection lines of said memory circuit.

7. The printer of claim 6, wherein said buffer circuit includes a first counter circuit connected to said first input of said multiplexer and a second counter circuit connected to said second input of said multiplexer.

8. The printer of claim 7, wherein said first counter circuit includes a first stroke counter circuit, a first die counter circuit, and a first bank counter circuit.

9. The printer of claim 8, wherein said second counter circuit includes a second stroke counter circuit, a second die counter circuit, and a second bank counter circuit.

10. The printer of claim 9, wherein said first stroke counter circuit is an N-bit binary counter.

11. The printer of claim 10, wherein said first die counter circuit is an M-bit binary counter, where M is equal to the number of dies in a printbar.

12. The printer of claim 11, wherein said first bank counter circuit is an O-bit counter, where O is equal to the number of banks with a single die.

13. The printer of claim 12, wherein said second stroke counter circuit is an N-bit binary counter.

14. The printer of claim 13, wherein said second die counter circuit is an M-bit binary counter.

15. The printer of claim 14, wherein said second bank counter circuit is an O-bit counter.

16. The printer of claim 15, wherein said buffer circuit further comprises a steering circuit receiving the segments read from the memory in the second order and serially transmitting each of the segments read in the second order to a selected one of said banks of said printbar.

17. A method for printing on a recording medium moving in a process direction a raster image, having a plurality of scan lines generated by an output device, with a printbar, angled with respect to the process direction, printing portions of N of the scan lines substantially simultaneously, and having a plurality of printhead dies, each die including a plurality of nozzles, comprising:
   organizing a memory space into a plurality of rows and a plurality of columns, the plurality of rows being equal to N and the plurality of columns being equal to the plurality of nozzles of the printbar;
   dividing each of the plurality of scan lines into a plurality of portions;
   writing each portion of one of the plurality of divided scan lines to a different one of the plurality rows of the memory space;
   reading the written portions from a single one of the plurality of rows of the memory space; and
   transmitting the read portions to the printbar.

18. The method of claim 17, comprising:
   firing the nozzles in each of the plurality of banks simultaneously;
   and firing the plurality of banks within a printhead die sequentially.

19. The method of claim 18, wherein said dividing step further includes dividing each of the plurality of portions into a plurality of segments.

20. The method of claim 19, wherein said organizing step further includes organizing each of the plurality of columns into a plurality of sub-columns wherein the plurality of sub-columns is at least equal to the plurality of banks within one of said plurality of printhead dies.

21. The method of claim 20, wherein said organizing step further includes organizing a single row of a single sub-column into an addressable cell.

22. The method of claim 21, wherein said writing step further comprises writing each segment of the plurality of segments into one of the addressable cells.

23. The method of claim 22, wherein said reading step further comprises reading each of the written segments from a single row of the memory space.

24. The method of claim 23, wherein said transmitting step further comprises transmitting each of the read segments to one of the banks of each of the plurality of printhead dies.

* * * * *